United States Patent [19]

Shaw

[11] 3,913,810

[45] Oct. 21, 1975

[54] TISSUE DISPENSER WITH CLIPS FOR DISPOSAL BAG

[75] Inventor: William H. Shaw, Duncansville, Pa.

[73] Assignees: Joyce M. Woomer, Duncansville; Oliver E. Mattas, Jr., Hollidaysburg; Robert E. Woomer, Duncansville, all of Pa. ; part interest to each

[22] Filed: Apr. 2, 1974

[21] Appl. No.: 457,356

[52] U.S. Cl. ....... 224/42.45 B; 248/95; 248/DIG. 5; 224/42.46 B
[51] Int. Cl.² ............................................ B60R 7/00
[58] Field of Search .......... 224/29 R, 29 A, 29 D, 224/42.42 R, 42.42 A, 42.45 B, 42.46 B, 224/42.45 R, 42.46 R, 42.1 C, 42.1 R; 248/95, DIG. 5

[56] References Cited
UNITED STATES PATENTS

| 2,454,857 | 11/1948 | Bish | 248/95 |
|---|---|---|---|
| 2,887,216 | 5/1959 | Hargraves | 248/DIG. 5 |
| 2,915,082 | 12/1959 | Shaw | 224/42.45 R |
| 2,969,900 | 1/1961 | Hevler | 224/29 R |
| 3,252,637 | 5/1966 | Hart | 224/29 D |
| 3,458,095 | 7/1969 | Stall | 224/42.42 R |
| 3,630,343 | 12/1971 | Wohl | 224/29 R |
| 3,756,652 | 9/1973 | Trammell, Jr. | 248/DIG. 5 |

*Primary Examiner*—Robert J. Spar
*Assistant Examiner*—Lawrence J. Oresky
*Attorney, Agent, or Firm*—Clarence A. O'Brien; Harvey B. Jacobson

[57] ABSTRACT

A tissue dispenser particularly for mounting adjacent a lower portion of an automobile seat has a bracket formed from a pair of U-shaped members arranged perpendicularly to one another for retaining a conventional box of tissue. The bracket is attached to a suitable automobile seat by a mounting assembly including an arm connected to the bracket and a clamp connected to the arm and selectively connectible to a portion of the seat. A suitable clip may be affixed to a leg of one of the U-shaped member for gripping a waste container.

1 Claim, 6 Drawing Figures

U.S. Patent Oct. 21, 1975 3,913,810
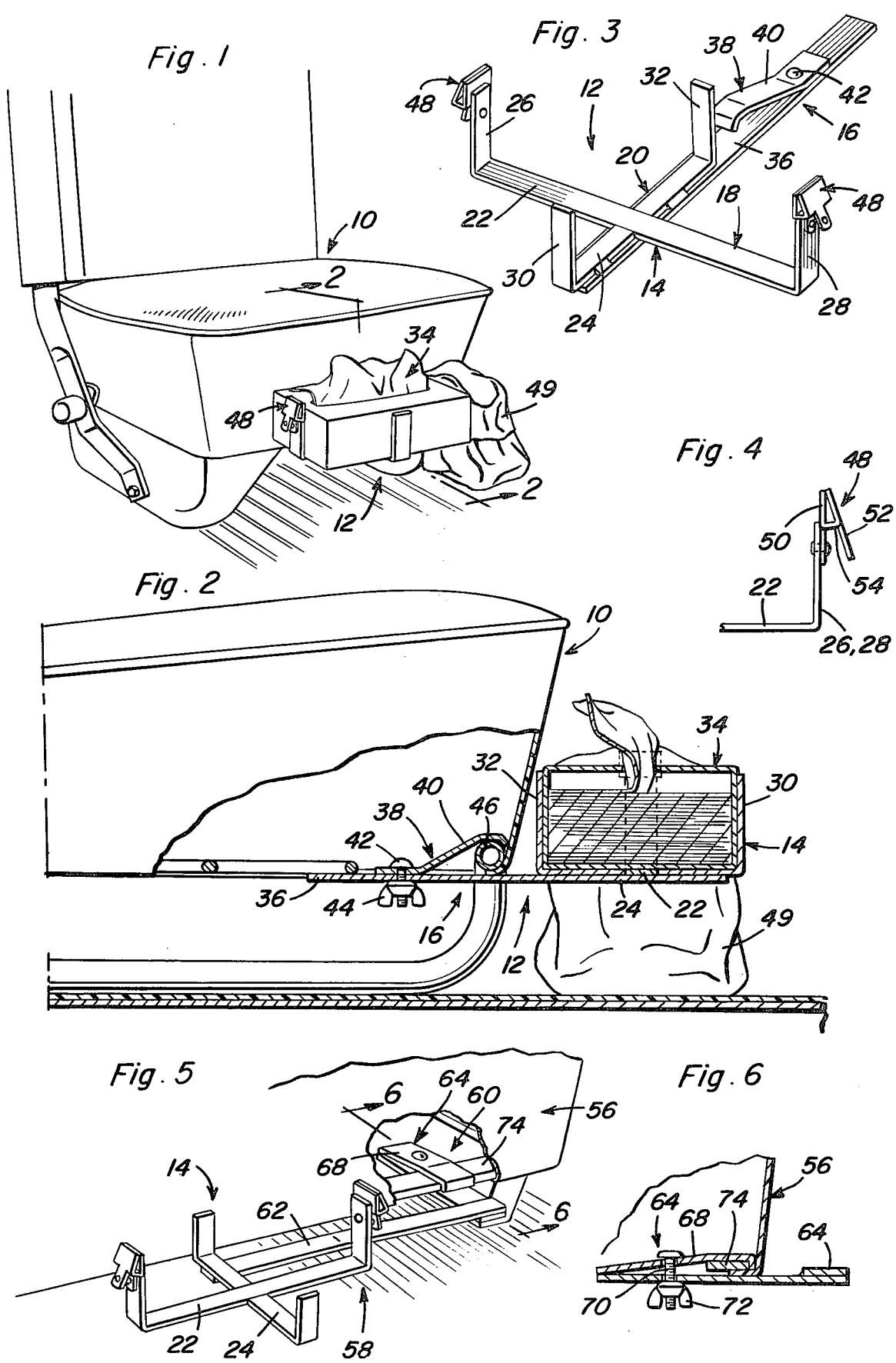

TISSUE DISPENSER WITH CLIPS FOR DISPOSAL BAG

BACKGROUND OF THE INVENTION

1. Field of the Invention

This invention relates generally to a tissue dispenser capable of retaining a litter bag or similar container, and particularly to a tissue dispenser attachable to a seat in a motor vehicle.

2. Description of the Prior Art

It is known to provide the interior of an automobile with tissue dispensers and litter receptacles. U.S. Patent No. 3,458,095, issued July 29, 1969 to O. T. Stall, discloses a combination tissue dispenser and waste receptacle unit mountable on the center hump of a vehicle. Such a location, however, as well as such locations as vacant seats, dash, visor, door and window handles, and the like tend to get in the way and can be unsightly. It is generally known to mount a litter disposal receptacle to the lower front portion of an automobile seat. See, for example, U.S. Pats. Nos. 3,504,830 and 3,526,314, both issued to E. M. Tramell, Jr. on Apr. 7, 1970 and September 1, 1970, respectively

SUMMARY OF THE INVENTION

It is an object of the present invention to provide apparatus capable of retaining a box of tissue and a litter bag.

It is another object of the present invention to provide a tissue box and litter bag retaining apparatus which readily moves as a part of an associated vehicle seat.

It is still another object of the present invention to provide a tissue dispenser of simple yet rugged construction and which is easily mounted on a suitable vehicle seat.

These and other objects are achieved according to the present invention by providing a tissue dispenser having a bracket arranged for retaining a box of tissue, and a mounting assembly connected to the bracket for attaching same to a suitable vehicle seat.

The bracket, or tissue box retaining frame, advantageously is constructed from a pair of U-shaped members each of which has a longitudinally extending web and a pair of parallel, co-directional legs. By connecting together the webs at median portions thereof, and arranging the longitudinal extent of the webs perpendicular to one another and with the legs of each of the members extending co-directionally, a retaining frame is provided that makes use of the tissue box itself as dispenser.

The mounting assembly is basically formed by an elongated arm arrangeably extending under and against an underside of a seat, and a clamp provided on the arm for holding the arm and bracket on a seat. In one preferred embodiment of a mounting assembly, according to the present invention, the arm is connected to the web of one of the members and is arranged extending parallel to the web to which it is connected. The clamp, which includes a jaw arranged parallel to the arm and a fastening arrangement connecting the jaw to the arm for embracing a portion of a seat, inserted between the jaw and arm, may also be arranged parallel to the arm and the web to which the arm is connected. Alternatively, the arm may be connected to the web of one of the members and be arranged extending perpendicularly to the web to which it is connected. In the latter instance, the clamp will further include a plate mounted on the arm so as to extend perpendicularly therefrom.

A particularly advantageous feature of the present invention concerns the provision of a clip mounted on one of the legs of the U-shaped members and arranged for gripping a disposal waste container, such as a disposable litter bag. The clip includes a pair of jaw elements, each element having a jaw portion and a handle portion. The handle portion of one of the jaw elements is advantageously connected to one of the legs of the U-shaped members, while a web connecting together the jaw elements functions as a spring which biases the jaw portions of the elements toward one another.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing a tissue dispenser according to the present invention mounted on an automotive bucket seat.

FIG. 2 is a fragmentary sectional view taken generally along the line 2—2 of FIG. 1.

FIG. 3 is a perspective view showing the tissue dispenser of FIGS. 1 and 2, but with the tissue box removed.

FIG. 4 is a fragmentary, side elevational view showing the attachment and construction of a disposal bag retaining clip affixed to the tissue dispenser of FIGS. 1-3 in accordance with the present invention.

FIG. 5 is a fragmentary, perspective view, partly cut away in a section, showing an alternative embodiment of a tissue dispenser according to the present invention.

FIG. 6 is a fragmentary, sectional view taken generally along the line 6—6 of FIG. 5.

DESCRIPTION OF THE PREFERRED EMBODIMENTS

We turn now more particularly to FIGS. 1—3 of the drawings. A bucket seat 10, such as is conventionally used with certain makes of automobiles, has mounted thereon a tissue dispenser 12 according to the present invention. Dispenser 12 includes a bracket 14 which forms a tissue box retaining frame, and a mounting assembly 16 connected to bracket 14 for attaching same to seat 10.

Bracket 14 advantageously is formed by a pair of U-shaped members 18 and 20. Each of these member 18, 20 has a longitudinally extending web 22, 24 connecting together a pair of parallel, co-directional legs 26, 28 and 30, 32. The webs 22, 24 are themselves connected together at median portions thereof so as to be arranged with their longitudinal extents perpendicular to one another. Further, legs 26, 28 and 30, 32 are all arranged so as to extend co-directionally. In this manner, a frame is constructed which will readily hold a conventional box 34 of tissue, and the like.

Mounting assembly 16 includes an elongated arm 36 arrangeably extending under and against an underside of seat 10. A clamp 38 is provided on arm 36 for holding arm 36 and bracket 14 on seat 10. As can best be seen from FIG. 3 of the drawings, arm 36 is connected to web 24 in a suitable manner, and is arranged extending parallel to web 24. Clamp 38 includes a jaw 40 arranged parallel to arm 36 and retained thereon as by a bolt 42 arranged passing through mating holes provided in jaw 40 and arm 36. Bolt 42 is advantageously secured in the aforementioned holes by a conventional wing nut 44. In this manner, jaw 40 is connected to arm 36 for embracing a rail 46 inserted between jaw 40 and arm 36 and mounting dispenser 12 on seat 10.

Referring now to FIG. 4 of the drawings, a pair of clips 48 are shown mounted on respective ones of the legs of members 18 and 20. These clips 48 are arranged for gripping, and thereby retaining, a disposable waste container such as the plastic bag 49. Each clip 48 includes a pair of jaw elements 50 and 52, with each of the elements 50, 52 having a jaw portion and a handle portion. The handle portion of element 50 is advantageously connected in a conventional manner, such as by the illustrated rivet to one of legs 26, 28. A web 54 connecting together the elements 50, 52 is constructed from a spring steel or suitable plastic, and the like, to function as a spring which biases the jaw portions of elements 50, 52 toward one another to normally grip sheet material and the like. The sheet material forming the disposable container may be inserted between the jaw portions by pressing the handle portion of element 52 toward the handle portion of element 50.

FIGS. 5 and 6 of the drawings show a bench seat 56 of a conventional construction commonly used for automobile seats. A dispenser 58, according to the present invention, is mounted on seat 56 as by a suitable mounting assembly 60. Since the bracket portion of dispenser 58 is originally identical to bracket 14, the construction of this portion of the dispenser 58 will not be discussed in detail herein. Mounting assembly 60 has an arm 62 connected to web 24 and arranged extending perpendicularly to web 24. A clamp 64 is attached to the end of arm 62 spaced from web 24.

Clamp 64 includes a plate 66 mounted on arm 62 adjacent the aforementioned end spaced from web 24 so as to extend perpendicularly from arm 62. A jaw 68 is adjustably fastened to plate 66 as by a bolt 70 arranged passing through mating holes provided in plate 66 and jaw 68 so as to connect the jaw to the plate in such a manner that tightening of a wing nut 72 on bolt 70 will cause the jaw and plate to clampingly embrace a rail 74 forming a portion of seat 56 inserted between the jaw and plate. In this manner, dispenser 58 is securely mounted to seat 56.

As can be readily understood from the above description and from the drawings, a tissue dispenser according to the present invention provides for facial tissue and a litter bag or bags arranged at a driver's fingertips so that a driver need not take his eyes off the road to get facial tissue and to dispose of same as well as other waste. Further, the facial tissue and litter bag may be arranged in a position where they are available to a passenger, but are not so arranged as to be unsightly and under foot. No tissue box need be placed on a seat, dash, visor, and the like, so as to get in the way of the vehicle operator and passengers and become unsightly. The tissue dispenser is inexpensive to manufacture and market, and requires no tools to install. Manipulation of the wing nuts with one's fingers is all that is required for installation.

Tissue box retaining frame and litter bag retainer according to the present invention readily moves a part of an associated seat without requiring floor mounts, and the like. Thus, the dispenser moves with an associated seat for different seat adjustments. The provision of one or more clips on the dispenser promotes the use of litter bags, while keeping the tissue box and litter bag positioned out of the way in the least used space in an automobile. Simultaneously, the tissue box and litter bag are within easy reach of driver and passenger. The dispenser makes use of a tissue box itself, and thus requires no box constructed from metal or other material to add weight to the vehicle and take up necessary space. The dispenser can be installed very easily by an automobile owner in a matter of minutes, while answering the need to have a box of tissues at the driver's fingertips. Most importantly, a tissue dispenser according to the present invention reduces the cost of production down to a minimum, while providing a very sturdy and durable article. The dispenser may be easily be transferred from automobile to automobile. The disposable litter bags can be removed and a new bag installed with a touch of the retaining clips. These clips retain the litter bags at the fingertips of, for example, occupants of both front seats, but places the bags out of the way of the occupants. A tissue box can be removed from its retaining frame by lifting the box out of the retainer, and a new tissue box easily inserted without the necessity of lifting lids, moving any parts, or disturbing the mounting frame retainer. A tissue dispenser according to the present invention is adaptable to construction from many metals or plastics, and could be, for example, stamped out by conventional machines at very low cost.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tissue dispenser, comprising, in combination:
   a. a bracket arranged for retaining a box of tissue, the bracket including a pair of U-shaped members, each of the members having a longitudinally extending web and a pair of parallel, co-directional legs, the webs being connected together at median portions thereof and arranged with the longitudinal extent of the webs perpendicular to one another and with the legs of each of the members extending co-directionally, one web being longer than the other web;
   b. mounting means connected to the bracket for attaching same cantilever fashion to a seat, the mounting means including:
      1. a first elongated arm connected to the web of one of the members and connected to a second arm arrangeable extending under and against an underside of a seat; and
      2. clamp means provided on the second arm for holding the second arm and bracket on a seat cantilever-fashion, the bracket being arranged adjacent the seat, the clamp means including a plate mounted on the second arm, a jaw plate, and fastener means adjustably connecting the jaw plate to the plate for embracing a portion of a seat inserted between the jaw plate and plate whereby the longitudinal dimension of said jaw plate and the second arm project perpendicularly to the longitudinal dimension of the seat when clamped thereto, and the second arm extends horizontally and perpendicularly to said first elongated arm and parallel to said one web; and c. a clip mounted on one of the legs of the members and arranged for gripping a disposable waste container, the clip including a pair of jaw elements each having a jaw portion and a handle portion, the handle portion of one of the jaw elements being connected to the one of the legs, and spring means connecting together the jaw elements for biasing the jaw portions of the elements toward one another.

* * * * *